(12) United States Patent
Koga

(10) Patent No.: US 6,178,658 B1
(45) Date of Patent: Jan. 30, 2001

(54) MICROMETER

(75) Inventor: Satoshi Koga, Tsukuba (JP)

(73) Assignee: Mitutoyo Corporation, Kawasaki (JP)

(*) Notice: Under 35 U.S.C. 154(b), the term of this patent shall be extended for 0 days.

(21) Appl. No.: 09/217,840

(22) Filed: Dec. 22, 1998

(30) Foreign Application Priority Data

Dec. 26, 1997 (JP) .................................... 9-360345

(51) Int. Cl.$^7$ ..................................... G01B 3/00
(52) U.S. Cl. ........................... 33/831; 33/703; 33/704; 33/815
(58) Field of Search ............... 33/831, 703, 704, 33/815

(56) References Cited

U.S. PATENT DOCUMENTS

| | | | | |
|---|---|---|---|---|
| 280,339 | * | 7/1883 | Barnes | 33/831 |
| 793,620 | * | 6/1905 | Bailley | 33/831 |
| 923,880 | * | 6/1909 | Nielsen | 33/831 |
| 1,223,325 | * | 4/1917 | Jaques, Sr. | 33/831 |
| 1,333,943 | * | 3/1920 | Spalding | 33/831 |
| 1,337,165 | * | 4/1920 | Spence | 33/831 |
| 2,521,825 | * | 9/1950 | Brown | 33/831 |
| 4,550,507 | * | 11/1985 | Nishikata | 33/164 R |
| 4,993,167 | * | 2/1991 | Durfee, Jr. | 33/626 |
| 5,157,846 | * | 10/1992 | Fromme | 33/700 |
| 5,288,292 | * | 2/1994 | Giraud et al. | 606/166 |
| 5,343,624 | * | 9/1994 | Symons | 33/810 |
| 5,345,692 | * | 9/1994 | Babitchenko | 33/828 |
| 5,353,516 | * | 10/1994 | Dalton | 33/821 |
| 5,421,101 | * | 6/1995 | Rank | 33/831 |
| 5,433,015 | * | 7/1995 | Mazenet | 33/815 |
| 5,495,677 | * | 3/1996 | Tachikake et al. | 33/784 |
| 5,596,813 | * | 1/1997 | Olson, Jr. et al. | 33/816 |
| 5,760,392 | * | 6/1998 | Hisamoto et al. | 33/702 |
| 5,829,155 | * | 11/1998 | Takahashi et al. | 33/813 |
| 5,992,031 | * | 11/1999 | Shirai | 33/290 |

* cited by examiner

*Primary Examiner*—G. Bradley Bennett
*Assistant Examiner*—Gail Verbitsky
(74) *Attorney, Agent, or Firm*—Oliff & Berridge, PLC

(57) ABSTRACT

An inside of a U-shaped frame of a micrometer is made of a material having a smaller linear thermal expansion coefficient than an outside of the U-shaped configuration. Furthermore, a spindle can be made of a material having an extremely small linear thermal expansion coefficient. Accordingly, thermal deformation of the micrometer can be made smaller, and measurement accuracy is maintained even under a widely changing temperature.

7 Claims, 2 Drawing Sheets

F I G. 1
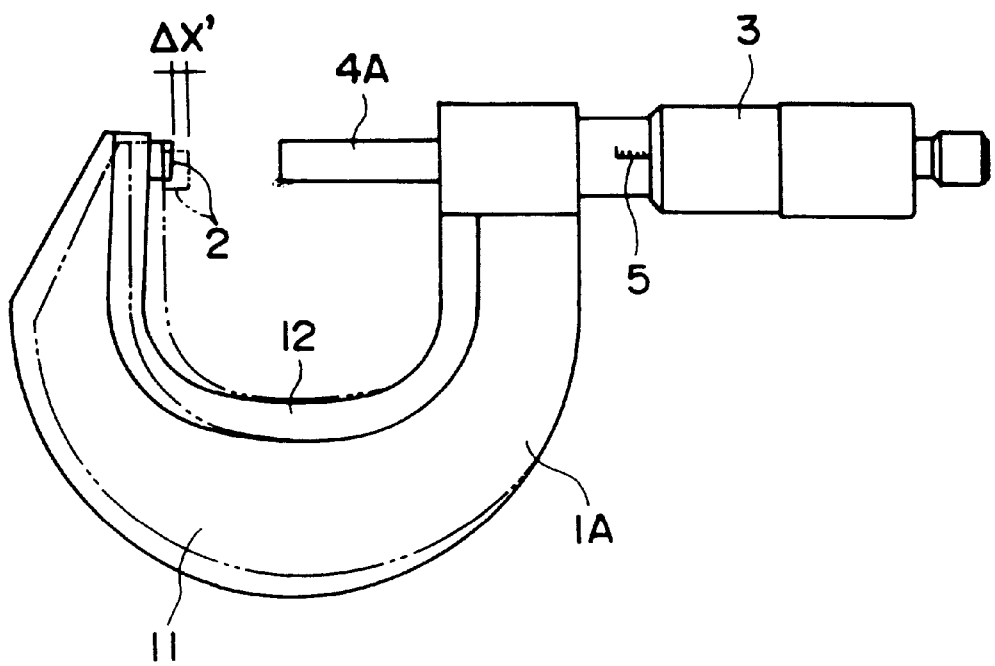
F I G. 2
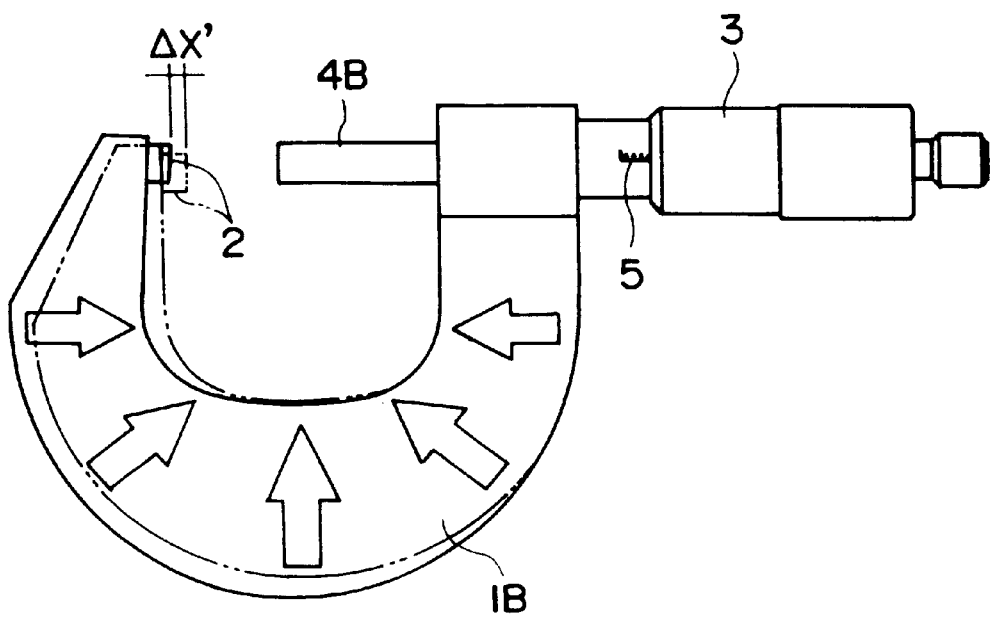

MICROMETER

BACKGROUND OF THE INVENTION

1. Field of the Invention

The present invention relates to a micrometer. More specifically, the present invention relates to a micrometer of which frame deformation in accordance with temperature change in using environment can be restrained as small as possible.

2. Description of Related Art

Conventionally, as shown in FIG. 3, an ordinary micrometer has a U-shaped frame 1, an anvil installed on one end of the frame 1, a feeding mechanism 3 (ordinarily, such as a feed screw) installed on the other end of the frame 1 and a spindle 4 to move forward and backward to the anvil 2.

The micrometer is ideally fixed to a stand or the like under an environment of a standard temperature (20° C., for example) in measuring a workpiece. However, the micrometer is often used under environments outside the standard temperature being held by hand. In other words, while holding the frame by one hand, the spindle 4 is advanced to the anvil 2 by handling the feeding mechanism 3 to hold the workpiece W between the spindle 4 and the anvil 2. At this state, the moving displacement amount of the spindle 4 is read from the scale (or graduation) 5.

When the micrometer is held by hand under an environment outside the standard temperature, the frame 1 is thermally deformed and the spindle is stretched or contracted by the circumambient temperature and heat of the hand, thereby deteriorating measurement accuracy.

As an instant case, the micrometer is held by one hand under an environment lower than the standard temperature. When the micrometer is thermally stabilized in advance to adjust the mechanical origin under an environment of standard temperature, the frame 1 has a configuration shown in double-dotted line in FIG. 4.

When a U-shaped bent portion 6 is held by hand to measure the workpiece, a temperature distribution of the frame 1 is changed to deform the frame 1 as shown in a solid line in FIG. 4, causing a frame deformation error of Δx. Furthermore, the spindle 4 is contracted to cause additional error to magnify an entire error.

To solve above disadvantage, a material having an extremely small linear thermal expansion coefficient may be employed to both of the frame 1 and the spindle 4. However, it is not practical in view of production cost or the like.

SUMMARY OF THE INVENTION

An object of the present invention is to provide a micrometer adapted to maintain measurement accuracy under an environment of widely changing temperature and to enhance usability, while being manufactured economically.

A micrometer according to the present invention has a frame having a U-shaped configuration; an anvil provided on an end of the frame; and a spindle provided on the other end of the frame to advance and retract relative to the anvil. The micrometer is characterized in that the frame is made of a material of which a linear thermal expansion coefficient is smaller at an inside of the U-shaped configuration than an outside thereof.

According to the above arrangement, since the inside of the U-shaped configuration of the frame has a smaller linear thermal expansion coefficient than the outside thereof, a displacement amount of an end of the frame relative to the other end can be decreased as compared to a conventional micrometer by virtue of a "bimetal effect" (thermal deformation effect like a bimetal).

In other words, when a distribution of temperature applied to the frame is changed, for example, when the temperature of the frame is lowered below a standard temperature, the inside of the U-shaped configuration is less contracted than the outside of the U-shaped configuration. Accordingly, a frame deformation to make one end of the frame approach the other end is decreased so that an error caused by the deformation of the frame is made smaller than the conventional micrometer.

When the temperature of the frame is raised higher than the standard temperature, the inside of the U-shaped configuration is less stretched than the outside of the U-shaped configuration. Accordingly, a deformation which causes one end of the frame to move away from the other end is restrained to make the error caused by the deformation of the frame smaller than the conventional micrometer.

Accordingly, measurement accuracy of the micrometer can be maintained under a widely changing temperature to allow freer usage. Furthermore, since the frame is not required to be made of an extremely small linear thermal expansion coefficient, the micrometer can be manufactured economically.

In the above arrangement, to make the linear thermal expansion coefficient of the inside of the U-shaped configuration smaller than the outside, the frame is preferably made as follows.

The frame preferably includes an outer member disposed on the outside of the U-shaped configuration and an inner member unitedly provided on an inner surface of the outer member, the inner member being made of a material having a smaller linear thermal expansion coefficient than the outer member.

Accordingly, the outer member and the inner member can be separately made of a material having a different linear thermal expansion coefficient, e.g. cast iron and alumina ceramics, to be integrally connected, for example, bonded. Accordingly, the micrometer can be manufactured economically.

Another member having an intermediate linear thermal expansion coefficient may be sandwiched between the outer member and the inner member to make multi-layered structure of more than two layers.

Alternatively, the frame may be made of a material of which the linear thermal expansion coefficient gradually decreases from the outside of the U-shaped configuration to the inside thereof. In the above, the frame may be made of a material comprising zirconium oxide and nickel of which a mixing ratio varies gradually from the outside of the U-shaped configuration to the inside thereof, for example. The linear thermal expansion coefficient may be inclined to change consecutively, or alternatively, may be changed step-wise at an optional phase.

Accordingly, since no attaching of the outer member and the inner member is necessary, the manufacture can be simplified.

In the above arrangement, the spindle is preferably made of a material of a smaller linear thermal expansion coefficient than the material of the frame such as Invar of which the linear thermal expansion coefficient is approximately $1.2 \times 10^{-6}/°C$.

Accordingly, an error caused by a stretch and a contraction of the spindle due to temperature change can also be diminished, so that the measurement accuracy can be maintained over more widely changing temperature to improve usability.

BRIEF DESCRIPTION OF THE DRAWINGS

FIG. 1 is a front elevational view showing a first embodiment of a micrometer according to the present invention;

FIG. 2 is a front elevational view showing a second embodiment of the micrometer according to the present invention;

DETAILED DESCRIPTION OF PREFERRED EMBODIMENT(S)

Figure 3:
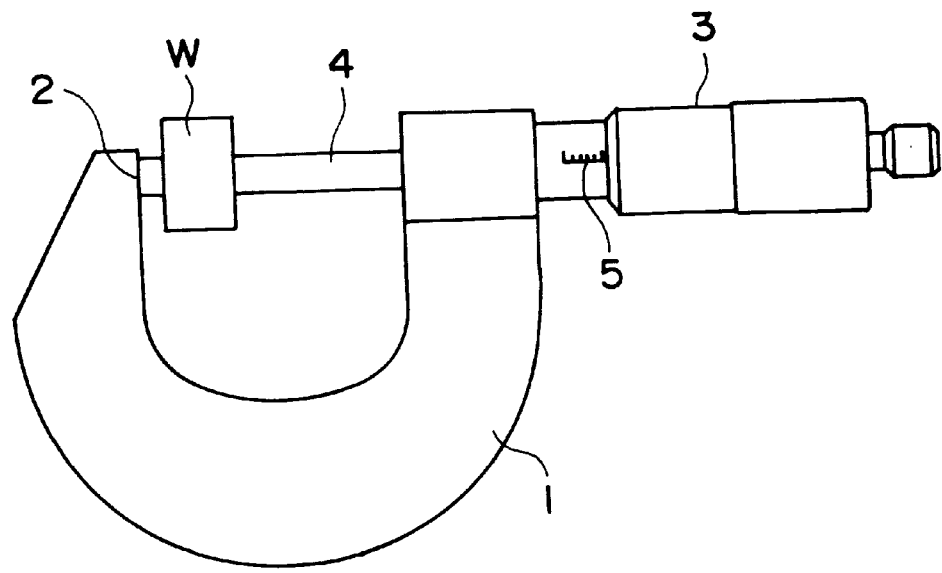
FIG. 3 is a front elevational view showing a conventional micrometer.
Figure 4:
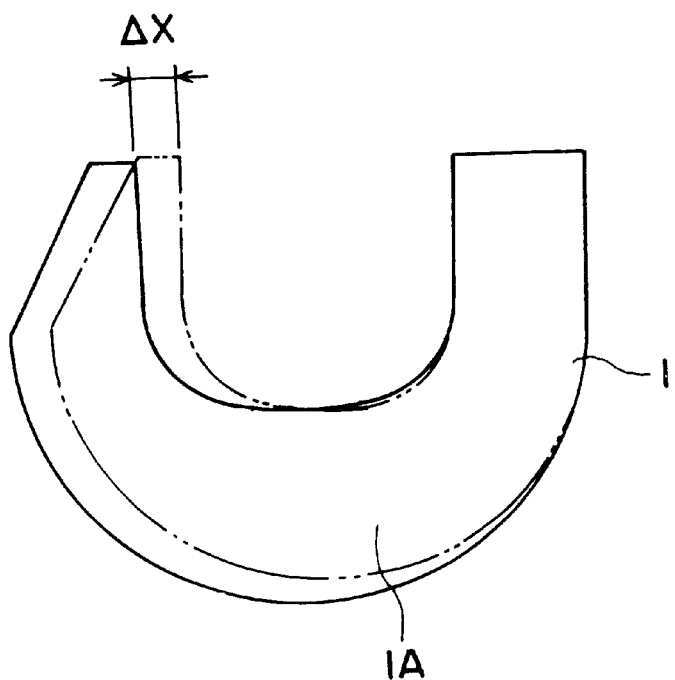
FIG. 4 is a view showing a frame for explaining a disadvantage of the conventional micrometer.

Preferred embodiments of the present invention will be described below with reference to drawings. Incidentally, identical signs are applied to the same components as of FIG. 3 to omit or simplify the description.

First Embodiment

FIG. 1 shows a micrometer according to a first embodiment. A frame and a spindle of the micrometer according to the present embodiment are different from a micrometer shown in FIG. 3.

The frame 1A having a U-shaped configuration of the present embodiment is made of a material of which the linear thermal expansion coefficient is smaller at an inside of the U-shaped configuration than an outside thereof. Here, the frame 1A is made of an approximately U-shaped outer member 11 disposed at an outside of the U-shaped configuration and an approximately U-shaped inner member 12 united to an inner surface of the outer member 11. The inner member 12 is made of a material having smaller linear expansivity than the outer member 11.

The outer member 11 employs a specific material of, for example, cast iron (linear thermal expansion coefficient $12 \times 10^{-6}/°$ C.). The inner member 12 employs a specific material of, for example, alumina ceramic 92 (linear thermal expansion coefficient of $8.0 \times 10^{-6}/°$ C.).

A spindle 4A of the present embodiment is made of a material having an extremely small linear thermal expansion coefficient, smaller than the material of the frame 1A here, for example, Invar (linear thermal expansion coefficient $1.2 \times 10^{-6}/°$ C.).

Since the inner surface of the outer member 11 has united thereto the inner member 12 of which material has a smaller linear thermal expansion coefficient than the outer member 11, when the temperature of the frame 1A is lowered, for example, below a standard temperature, the inner member 12 is less contracted than the outer member 11. Accordingly, an end (on the anvil 2 side) of the frame 1A can be restrained to deform in a direction approaching toward the other end (an end supporting the spindle 4A).

On the contrary, when the temperature of the frame 1A is raised above the standard temperature, the inner member 12 is less stretched than the outer member 11, so that an end (on the anvil 2 side) of the frame 1A can be restrained to deform in a direction moving away from the other end (an end supporting the spindle 4A).

Accordingly, an error $\Delta x'$ caused by the deformation of the frame 1A can be made smaller than an error $\Delta x$ of a conventional micrometer, so that a measurement accuracy can be maintained under widely changing temperature to enhance usability. The material of the frame 1A is not necessary to be of a material having an extremely small linear thermal expansion coefficient, allowing production cost to be inexpensive.

Furthermore, since the spindle 4A is made of the material having an extremely small linear thermal expansion coefficient, the error caused by stretch and the contraction of the spindle 4A due to temperature change can also be diminished, so that a measurement accuracy can be maintained under further widely changing temperature to improve usability.

For providing the inner member 12 unitedly to the inner surface of the outer member 11, the outer member 11 and inner member 12 may be separately made by materials having different linear thermal expansion coefficient (the material for the inner member 12 has a smaller linear thermal expansion coefficient than the outer member 11) and the inner member 12 may be unitedly bonded by an adhesive to the inner surface of the U-shaped configuration of the outer member 11. In other words, the outer member 11 and the inner member 12 are attached unitedly, thereby allowing to be economically manufactured.

Second Embodiment

FIG. 2 shows a micrometer according to the second embodiment. The micrometer according to the present embodiment has a frame and a spindle different from the micrometer shown in FIG. 3.

A frame 1B of the present embodiment is made of a material of which the linear thermal expansion coefficient is gradually decreased from the outside of the U-shaped configuration to the inside. In other words, as shown in an arrow in the FIG. 2, the linear thermal expansion coefficient is gradually decreased from the outside of the U-shaped configuration to the inside. For example, a mixing ratio of zirconium oxide and nickel is gradually varied from the outside of the U-shaped configuration to the inside.

Incidentally, a spindle 4B of the present embodiment is the same as the spindle 4A of the first embodiment.

According to the present embodiment, since the frame 1B is made of the material of which the linear thermal expansion coefficient is gradually decreased from the outside of the U-shaped configuration to the inside, no attachment process of the outer member 11 and the inner member 12 of the first embodiment is necessary. Accordingly, the micrometer can be manufactured easily. Other effects described in the first embodiment except for the arrangement of attaching the outer member 11 and the inner member 12 can also be expected according to the present embodiment.

The displacement of the spindle 4 of the above-described embodiments is read by the scale (or graduation) 5. However, the present invention can be applied to a micrometer in which the displacement of the spindle 4 is detected by encoders such as photoelectric, electrostatic and magnetic type encoders and is processed to be digitally displayed.

The feeding mechanism according to the present invention is not restricted to a feed screw mechanism, but any mechanism can be used as long as the spindle 4A and 4B can be moved forward and backward relative to the anvil 2.

What is claimed is:

1. A micrometer comprising:

a frame having a U-shaped configuration;

an anvil provided on an end of the frame; and a spindle provided on the other end of the frame to move forward and backward relative to the anvil, wherein the frame is made of a material of which the linear thermal expansion coefficient is smaller at an inside of the U-shaped configuration than at an outside thereof.

2. The micrometer according to claim 1, wherein the frame comprises an outer member disposed on the outside of the U-shaped configuration and an inner member united on an inner surface of the outer member, the inner member being made of a material having a smaller linear thermal expansion coefficient than the outer member.

3. The micrometer according to claim 2, wherein the outer member is made of cast iron, and wherein the inner member is made of alumina ceramic.

4. The micrometer according to claim 1, wherein the frame is made of a material of which the linear thermal expansion coefficient gradually decreases from the outside of the U-shaped configuration to the inside thereof.

5. The micrometer according to claim 4, wherein the frame is made of a material comprising zirconium oxide and nickel, and wherein a mixing ratio of the zirconium oxide and the nickel varies gradually from the outside of the U-shaped configuration to the inside thereof.

6. The micrometer according to claim 1, wherein the spindle is made of a material of a smaller linear thermal expansion coefficient than that of the material of the frame.

7. The micrometer according to claim 6, wherein the spindle is made of Invar.

* * * * *